United States Patent
Ahmed et al.

(10) Patent No.: US 6,985,726 B2
(45) Date of Patent: Jan. 10, 2006

(54) METHOD OF BLIND TRANSPORT FORMAT DETECTION

(75) Inventors: Walid Ahmed, Eatontown, NJ (US); Santanu Kumar Das, Basking Ridge, NJ (US); Lorenz Fred Freiberg, Swindon (GB); John G Grogan, Swindon (GB); Si Ming Pan, Emmaus, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 608 days.

(21) Appl. No.: 09/966,828

(22) Filed: Sep. 28, 2001

(65) Prior Publication Data
US 2003/0069017 A1 Apr. 10, 2003

(51) Int. Cl.
*H04Q 7/20* (2006.01)
*G06F 11/00* (2006.01)

(52) U.S. Cl. ............................. 455/432.2; 455/432.2; 455/67.11; 714/48; 714/49

(58) Field of Classification Search ............ 455/432.2, 455/67.11, 434, 511, 515, 421, 522, 69; 714/48–52, 714/28, 792, 4, 25, 2, 6, 790, 801; 370/252, 370/337, 95.1, 95.3; 379/63
See application file for complete search history.

(56) References Cited

U.S. PATENT DOCUMENTS

| | | | |
|---|---|---|---|
| 5,509,020 A | | 4/1996 | Iwakiri et al. ............... 371/43 |
| 5,928,377 A | * | 7/1999 | Doran et al. ............... 714/786 |
| 6,397,358 B1 | * | 5/2002 | Burton et al. ............... 714/705 |
| 6,732,302 B1 | * | 5/2004 | Palenius et al. ............ 714/48 |
| 2002/0108090 A1 | * | 8/2002 | Ariel et al. ................ 714/792 |
| 2003/0036403 A1 | * | 2/2003 | Shiu et al. ................. 455/522 |

FOREIGN PATENT DOCUMENTS

WO    WO 01/24465 A1    4/2001

\* cited by examiner

*Primary Examiner*—Sonny Trinh
*Assistant Examiner*—Thai N. Vu
(74) *Attorney, Agent, or Firm*—James Milton

(57) ABSTRACT

A method of detecting the format of received information by detecting the format of a guiding channel of a communication system. With the use of a lookup table or other mapping technique, the detected guiding channel format is used to determine the format of the other channels of the communication system. Therefore, the format of received information can be determined without the use of TFCI information.

5 Claims, 3 Drawing Sheets

METHOD OF BLIND TRANSPORT FORMAT DETECTION

RELATED APPLICATIONS

Related subject matter is disclosed in the following applications concurrently filed herewith: U.S. Patent Applications entitled "Method of Blind Transport Format Detection Based on Power Transition" Ser. No. 09/966,504.

BACKGROUND OF THE INVENTION

1. Field of the Invention

The present invention relates to Blind Transport Format Detection (BTFD) for wireless communication systems.

2. Description of the Related Art

Communication systems and in particular, wireless communication system convey (i.e., transmit and/or receive) information over communication channels in accordance with protocols of one or more established communication standards. Protocols are rules and procedures that dictate how information within a communication system are to be transmitted, propagated and received. Established communication standards comprise protocols that have been reviewed and approved by committees typically formed from communication equipment manufacturers and pertinent government regulators.

In wireless communication systems, and in particular, in wireless communication system that comply with the 3 GPP (Third Generation Partnership Project) standard for UMTS (Universal Mobile Telecommunication System) systems, information that is to be transmitted are formatted in multiple modes. The information is transmitted by transmission equipment which can be either system equipment or user equipment. The system equipment are the various equipment owned, operated and maintained by a system provider. Equipment at a base station are examples of system equipment. User equipment is any equipment typically used by a user or subscriber of a wireless communication system. Examples of user equipment include cellular phones, wireless laptops and pagers.

The formatting of information refers to the arrangement of units of information (typically bits) into groups or blocks of information where the size of each block is defined. Suppose, for example, that the 3GPP standard uses eight modes to do its formatting. Each of the eight modes of the 3GPP standard arranges information to be transmitted into three blocks respectively referred to as Class A, Class B and Class C blocks. In UMTS, the Class A, Class B and Class C blocks are referred to as Transport Channels (TrCh) and each Transport Channel has a format called a Transport Format (TF). The modes typically are the operating modes of Codecs which are devices and/or functions within the system equipment and/or subscriber equipment that perform the coding operations. The following is a table showing the format for each of the eight modes for UMTS systems that comply with the 3GPP standard:

TABLE 1

| Mode | Class A | Class B | Class C |
| --- | --- | --- | --- |
| mode 1 | 81 bits | 103 bits | 60 bits |
| mode 2 | 65 bits | 99 bits | 40 bits |
| mode 3 | 75 bits | 84 bits | 0 bits |
| mode 4 | 61 bits | 87 bits | 0 bits |
| mode 5 | 58 bits | 76 bits | 0 bits |
| mode 6 | 55 bits | 63 bits | 0 bits |
| mode 7 | 49 bits | 54 bits | 0 bits |
| mode 8 | 39 bits | 56 bits | 0 bits |

TABLE 1-continued

After the information to be transmitted is arranged, i.e., formatted, as per one of the above modes, each of the groups of information is coded for error correction and/or error detection. Coding is a technique whereby redundancies are introduced in information to be transmitted to protect the information from having errors due to the information having been propagated through a communication channel. Error correction coding is used to correct errors and error detection coding is used to detect errors. The formatted information is subjected to various levels of coding and information padding. In particular, for UMTS systems, the formatted information is applied to a Cyclic Redundancy Coder (CRC) and tail bits are then added to pad the coded information. The formatted, coded and padded information is then applied to a convolutional coder. The output of the convolutional coder is the information coded through special mapping of every unit of the information. For example, for a convolution coder which maps 2 bits for every 1 bit of information (i.e., Rate ½ coding), the total number of bits for each transport channel is doubled. Convolutional coded information for each of the three transport channels is thus generated. Convolutional coding is one type of error correction coding. CRC coding is one type of error detection coding. The information of the three channels are then multiplexed prior to transmission.

FIG. 1 depicts an example of a format of the transport channels of a UMTS that complies with the 3GPP standard. Information block 100 represents the format for a transport channel which contains A bits of information with an appendage of 8 CRC bits and 8 tail bits; this transport channel is commonly referred to as TrCh1. Information block 102 represents the format for a transport channel which contains B bits of information with 8 tail bits appended; this transport channel is commonly referred to as TrCh2. Information block 104 represents the format for a transport channel which contains C bits of information and 8 tail bits; this transport channel is commonly referred to as TrCh3.

The multiplexed information is then transmitted over a communication channel or channels of the UMTS system. In UMTS systems the information is transmitted in synchronization with a timing period called a TTI (Transmission Time Interval). Transmitting equipment and receiving equipment of the system are synchronized to the TTI. Each TTI period has a beginning and an end; three blocks as per Table 1 are transmitted during a TTI. At a receiving equipment, a Class A block is first received followed by a Class B block and then a Class C block. The size of each of these received blocks is dictated by the mode in which the system is currently operating.

At a receiving equipment, the information is decoded by applying procedures that are the reverse of the procedures applied by the transmitting equipment. As with the transmitting equipment, the receiving equipment can be system or subscriber equipment. In order to properly decode the formatted information, however, the receiving equipment uses the actual coded block of information and information about the formatting (i.e., size of the blocks of information over each of the transport channels) of the received block. In particular, a received coded and formatted block of information is decoded by using the actual block and the size of that block to decode (e.g., CRC decoding, convolutional decoding) the received information. For example, referring to Table 1, a Class A block of information is properly decoded when that block of information is applied to a decoder of the receiving equipment and the decoding uses the correct size value (i.e., the value of 81) to perform the decoding operation. If the size value used by the decoder is incorrect, the received block will not be decoded correctly.

To address the issue of knowing the correct block size, the current UMTS standard uses a signaling channel within which TFCI (Transport Format Combination Indicator) information is transmitted to the receiving equipment. The TFCI contains the value that represents the size of the received block. In the example discussed above, the TFCI would contain the value of 81 for a Class A block, 103 for a Class B block and 60 for a Class C block. Because the decoding of the received information is dependent upon a correct size value for a received block of information, the TFCI is typically heavily coded and made more robust so as to better handle channel anomalies thus reducing the likelihood of incurring errors. As a result, more bandwidth and power is needed to transmit the TFCI. Furthermore, even though the heavy coding of the TFCI reduces the likelihood of errors occurring in the TFCI, an error bound still exists. The error bound is the best error rate that can be expected from TFCI for the type and amount of coding applied to the TFCI.

What is therefore needed is a way of detecting the format of received information without having to use TFCI.

SUMMARY OF THE INVENTION

The present invention provides a method of detecting the format of received information without the use of TFCI information. The present invention provides a method for Blind Transport Format Detection (BTFD). One of the communication channels through which information is received is identified as a guiding channel of the communication system. A lookup table (or other mapping technique) is provided which contains the format of the communication channels of the system as defined by the standard being followed by the communication system. Information received over the guiding channel is extracted and is applied to decoding equipment along with guiding channel format information obtained from the lookup table. The guiding channel format information is information size value that defines the size of information blocks conveyed over a transport channel. Each guiding channel format information in the lookup table is separately used with the extracted information to perform decoding operations. The guiding channel format information that, when used to decode the extracted guiding channel information yields a correct decode, is detected as the correct format. The associated formats of the other channels as defined in the lookup table are then determined from the detected correct format of the guiding channel. Thus, the format of the received information is detected without the use of TFCI information.

DETAILED DESCRIPTION

Figure 1:
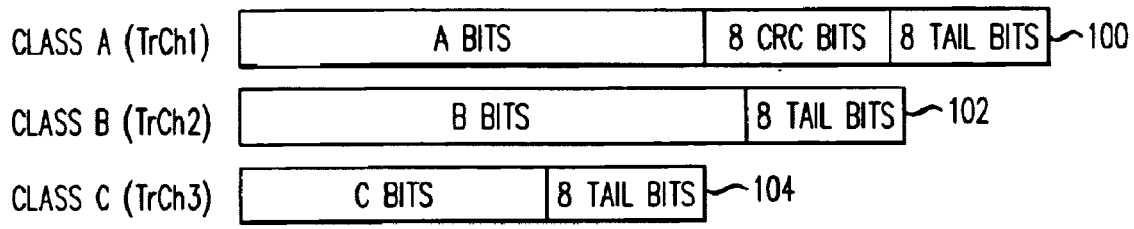
FIG. 1 depicts the format of the transport channels for a UMTS that complies with the 3GPP standard.

The present invention provides a method of detecting the format of received information without the use of TFCI information. The present invention provides a method for Blind Transport Format Detection (BTFD). One of the communication channels through which information is received is identified as a guiding channel of the communication system. A lookup table (or other mapping technique) is provided which contains the format of the communication channels of the system as defined by the standard being followed by the communication system. Information received over the guiding channel is extracted and is applied to decoding equipment along with guiding channel format information obtained from the lookup table. The guiding channel format information is information size value that defines the size of information blocks conveyed over a transport channel. Each guiding channel format information in the lookup table is separately used with the extracted information to perform decoding operations. The guiding channel format information that, when used to decode the extracted guiding channel information yields a correct decode, is detected as the correct format. The associated information size values of the other channels as defined in the lookup table are then determined from the detected correct information size value of the guiding channel. Thus, the format of the received information is detected without the use of TFCI information.

For ease of explanation, the method of the present invention will be explained in the context of a UMTS communication system that complies with the 3GPP standard with a format as per Table 1. The information is thus represented in digital form with the unit of information being a bit. It will be readily understood that the method of the present invention is applicable to other communication systems (wireline or wireless) that use some type of formatting scheme prior to transmitting information over their communication channels. Information to be transmitted are multiplexed into three different channels (called transport channels) each of which has a format defined as per Table 1. For purposes of discussion and ease of explanation, transport channel 1 (TrCh1), through which Class A bits are conveyed, is selected as the guiding channel. The guiding channel is one of the transport channels of the communication system whose information size value, once detected, will allow the information size value of the other channels to be determined from a lookup table or some other mapping technique. The format of all the transport channels can thus be detected. The channel through which Class B bits are conveyed is transport channel TrCh2 and the channel through which Class C bits are conveyed is transport channel TrCh3.

The guiding channel is preferably a channel that has a unique format for each of the modes of operation of the transmitting equipment and has more robust coding than the other channels. For example, TrCh1 is the only channel of the three channels that not only has tail bits, but also CRC coding bits. Further, each of the information size values for the eight modes of operation for TrCh1 is unique in that they are not repeated. For example, for TrCh1, no mode other than mode 1 has an information size value of 81 bits. Thus, using Table 1 as a lookup table, if an information size value of 81 is detected for the guiding channel (i.e., TrCh1), then the format of the other transport channels can be determined; that is, as per Table 1, information size of 81 for TrCh1 corresponds to information sizes of 103 and 60 for TrCh2 and TrCh3 respectively. The lookup table is constructed so that the corresponding formats (i.e., information size values) of the other transport channels can be determined once the guiding channel format is detected. It should be understood that more than one guiding channel can be used and criteria other than the ones described above (i.e., more robust coding, unique information size values) can be used to select the guiding channels. It should also be noted that the information size value can be expressed in terms other than the number of bits. For example, the information size value can represent the number of characters contained in the transmitted information where each character is 8 bits in length or some other length. Also, the information can also be represented in forms other than digital form.

Figure 2:
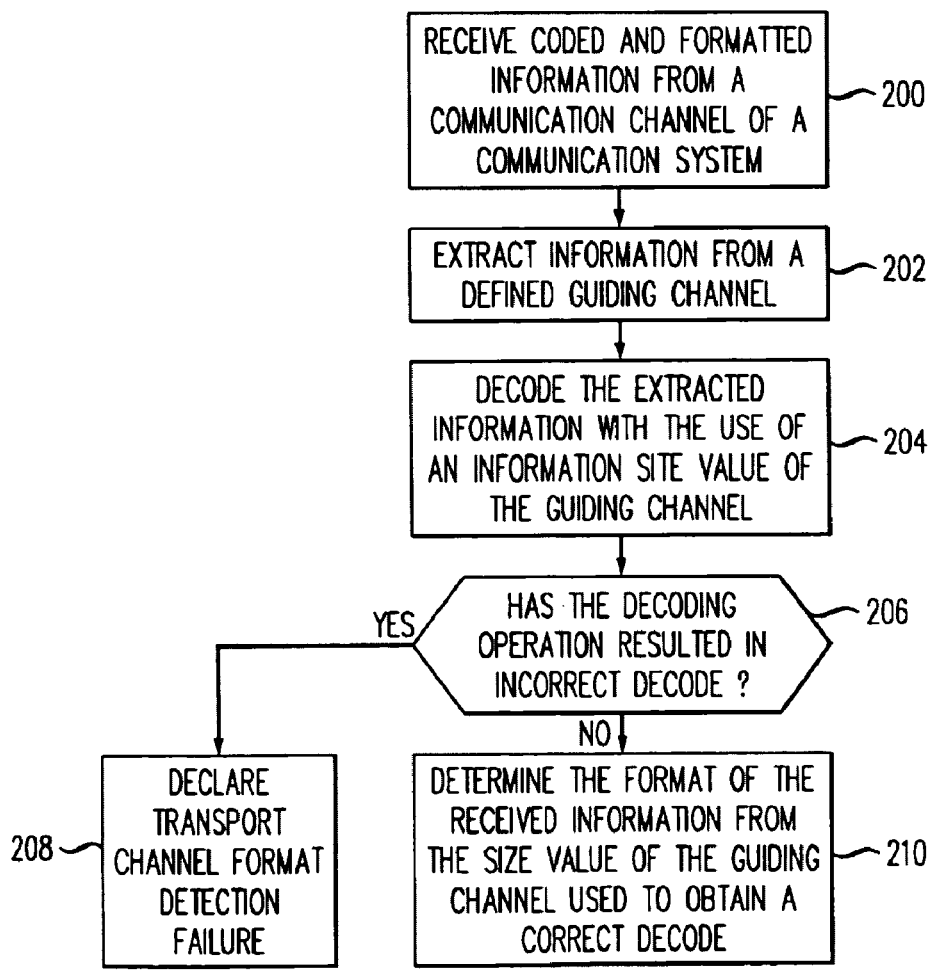
FIG. 2 is a flowchart depicting the method of the present invention.

Referring now to FIG. 2, in step 200, information is received by receiving equipment. In a UMTS communication system that complies with the 3GPP standard, the received information has been coded (CRC and convolutional) and formatted as previously discussed. The received information comprises information from the three transport channels. The information is received with radio, processing and other well known equipment typically used to detect and receive communication signals.

In step 202, information received over the guiding channel (i.e., TrCh1) is extracted. The information received over the other transport channels are also extracted. The information both from the guiding channel and the other channels are temporarily stored in any well known memory circuit for further processing. The beginning of the received information is determined from the TTI timing with which the received equipment and transmitting equipment are synchronized. The extraction of information from the channels comprise various steps necessary to receive—synchronously with the TTI—radio signals over the various channels, demodulate said signals, convert said signals to information bits and demultiplex the information bits into separate information blocks for each of the transport channels.

In step 204 decoding operations are performed on the information extracted from the guiding channel. Each decoding operation comprises an error correction decode followed by a tail bit test and an error detection decode operation. For example, when the error correction decode is convolutional decoding and the error detection decode is CRC decoding, the following procedure is performed for each decoding operation: the information extracted from the guiding channel is applied to a convolutional decoder; the convolutional decoder, which uses a certain number of shift operations or other timing operations dictated by the information size value, outputs a block of bits containing information bits (i.e., class A bits) with appended CRC bits and tail bits; tail bits are stripped off the result of the convolutional decoding and a tail bit test is performed on the tail bits; the remainder of the information is then applied to a CRC decoder which yields a CRC pass or CRC fail result. The decoding operation as described above is performed M times where M is an integer that represents the total number of modes used for the guiding channel or the total number of information size values defined for the guiding channel. Therefore, M=8 for a system which complies with the channel format defined by Table 1. It should be noted that the method of the present invention is applicable to other values for M and is not limited to a value of M=8.

As per the 3GPP standard, the 8 tail bits originally included in the transmitted information are all "0" bits. The tail bit test yields two values: one value is the number of "1" bits occurring in the tail bits and the other value indicates whether the tail bit test failed or passed. To determine whether the tail bit test passed or failed, a threshold is arbitrarily defined (by the service provider, for example) as a certain number of "1" bits occurring in the tail bits. For example, if the threshold is set to 2, the tail bit test will be declared as passing if the number of "1" bits is 2 or less. If the number of "1" bits is 3 or more, then the tail bit test is declared as failing.

For each of the M convolutional decoding operations, after the tail bits are stripped off the output of the convolutional coder, the remaining bits (i.e., Class A bits with appended CRC bits) are applied to a CRC decoder. It should be noted that a different information size value is used in each of the M convolutional decoding operations. A CRC decode operation is therefore similarly performed M times with the remaining bits where a different information size value is used to perform each of the M distinct CRC decode operations. The result of each of the CRC decode operations, which is either a "0" for 'CRC fail' or a "1" for 'CRC pass', is stored. Therefore, at the end of the decoding operations, M sets of data are stored where each set contains the following: (a) number of "1" tail bits; (b) Tail bit test "failed" or "passed"; and (c) CRC decode "pass" or "fail". As discussed above, the CRC decode operation and the tail bit test are performed on the result of the convolutional decode operation and these operations are performed M times.

In step 206, the M sets of data resulting from the decoding operations are applied to an algorithm that decides whether any of the results indicates a correct decode. The algorithm uses results (comprising three variables) to decide whether there was a correct decode, and if so, which of the M decode operations yielded the correct decode. The three variables are the result of the CRC decode (or CRC test), the result of the tail bit test and the number of non-zero bits (or "1" bits) occurring in the tail bit. In particular, the number of "1" tail bits for the $i^{th}$ decoding operation (or $i^{th}$ mode), where i=1, 2, ..., M is represented as $T_i$; i is any integer equal to M or less. A tail bit test "passed" if $T_i \leq T_0$ where $T_0$ represents the number of "1" bits occurring in the tail bits. $T_0$ is a value that can be set by the service provider and/or the manufacturer of transmitting and/or receiving equipment. $T_0$ is also modifiable. $K_i$ is a binary variable that indicates whether the tail bit test passed or failed for the $i^{th}$ mode; that is when the tail bit test fails, $K_i$ is set to 0 and when the tail bit test passes, $K_i$ is set to 1. $C_i$ is a binary variable that indicates whether the CRC decode operation passed or failed for the $i^{th}$ decode operation (or it mode); that is when a CRC decode operation passes, $C_i$ is set to 1 and when a CRC decode operation fails, $C_i$ is set to 0. Therefore the three resulting values at the end of the decoding operations on information extracted from the guiding channel are ($C_i$, $K_i$, $T_i$).

Figure 3:
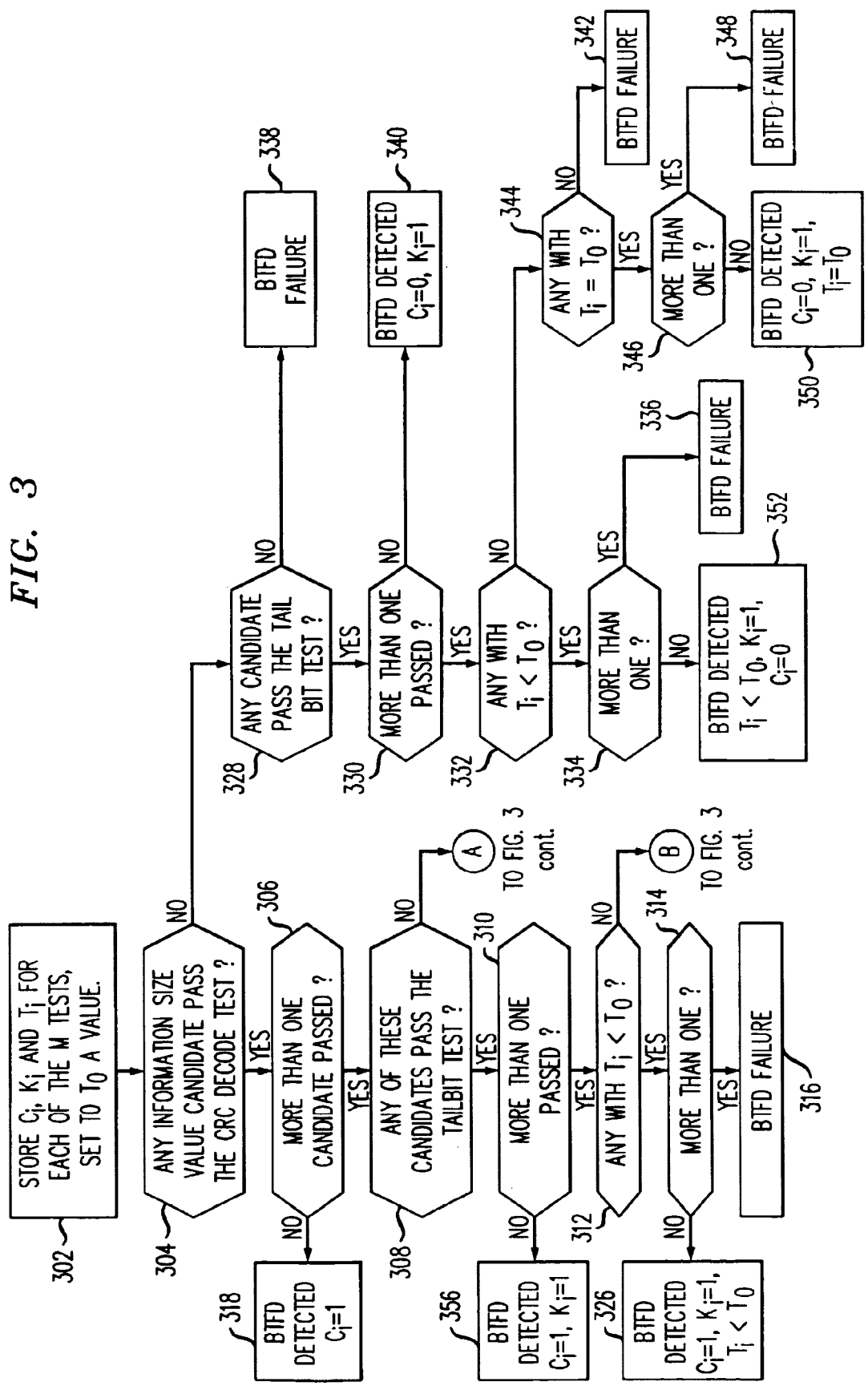
FIG. 3 is a flowchart representing an algorithm used to determine the correct format from one of the steps of FIG. 2.
Figure 3:
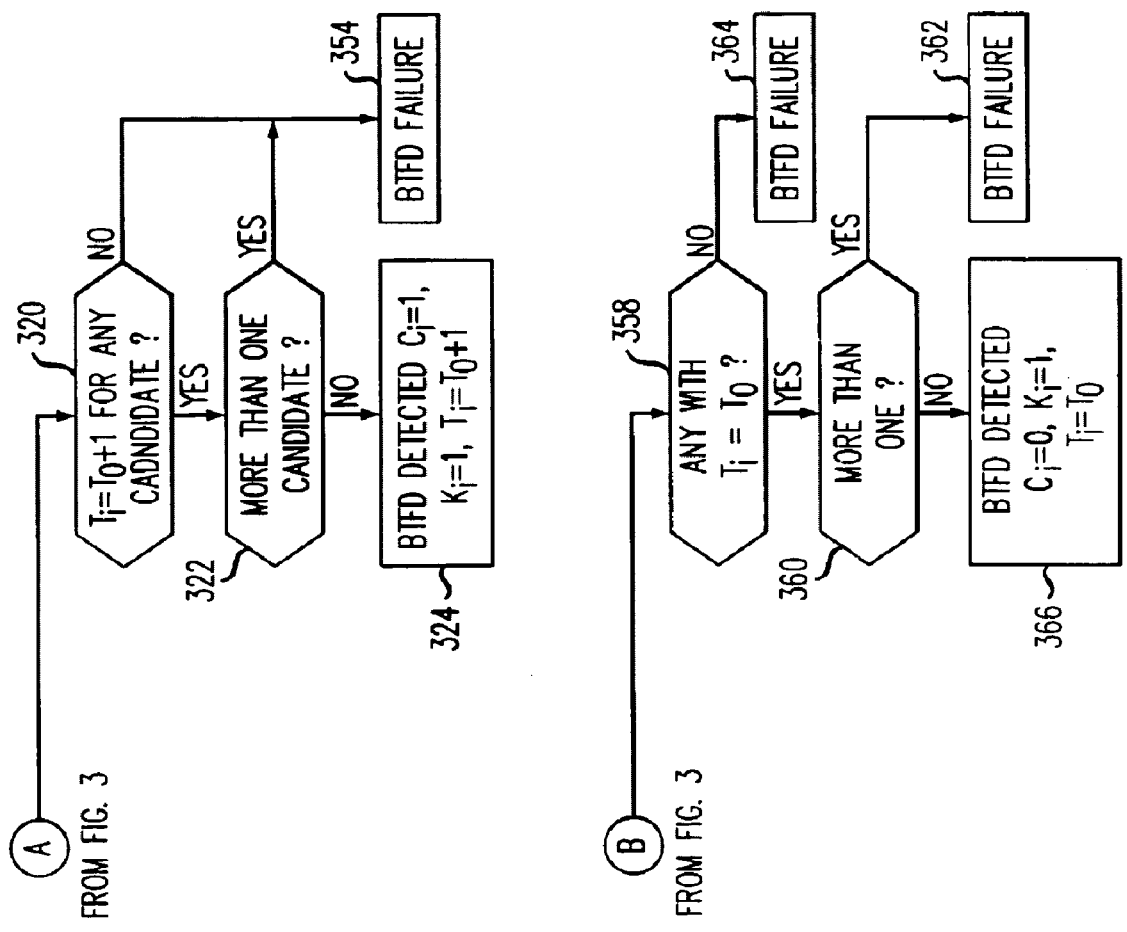

Referring momentarily to FIG. 3, one particular algorithm used for step 206 of FIG. 2 is now discussed. It should be understood that the algorithm shown in FIG. 3 is one specific procedure used to decide which one of M decode operation yields a correct decode based on the CRC decode, convolutional decode and tail bit test. It should further be understood that the method of the present invention is not limited to this one particular algorithm; other algorithms and/or techniques that use the results of decoding operations to decide whether there is a correct decode are well within the scope of the method of the present invention.

In step 302, the results ($C_i$, $K_i$, $T_i$) for each of the M decoding operations are stored. Each result set is a candidate for the correct decode. Also a value for $T_0$ is established. If none of the M decoding operations results yielded neither a CRC pass nor a tail bit test pass (steps 304→328→338), a BTFD failure is declared. In cases of BTFD failure, the receiving equipment will most likely try to determine the format from another transport channel or request that the transmit equipment re-transmit the information. If only one candidate yielded a CRC pass, a BTFD correct decode is declared for that operation (steps 304→306→318) where $C_i=1$. If none of the M decoding operations yielded a CRC pass and only one yielded a tail bit test pass, that particular mode is selected as a correct decode (steps 304→328→330→340) where $C_i=0$ and $K_i=1$.

If more than one candidate passed the CRC test and only one of these candidates passed the tail bit test, that candidate is selected as the correct decode (steps 304→306→308→310→356). When more than one candidate passed the CRC test and more than one of those candidates passed the tail bit test, the only candidate out of these candidates which had a number of "1" bits less than the set threshold, $T_0$, is declared the correct decode (steps 304→306→308→310→312→314→326) where $C_i=1$, $K_i=1$ and $T_i<T_0$. From step 314 if, out of the candidates who passed both the CRC test and the tail bit test, there were more than one in which $T_i<T_0$, then a BTFD) failure is declared (steps 304→306→308→310→312→314→316). From step 312, when more than one candidate passed both the CRC and the tail bit tests and none of these candidates satisfy the condition $T_i<T_0$, nor the condition $T_i=T_0$, the a BTFD failure is declared (steps 304→306→308→310→312→358→364). From step 358, if only one of the candidates who pass the CRC test, the tail bit test and did not satisfy the condition $T_i<T_0$, but satisfied the condition $T_i=T_0$, that candidate is declared as the correct decode (steps 304→306→308→310→312→358→360→366) where $C_i=1$, $K_i=1$ and $T_i=T_0$. From step 358, if more than one candidate satisfied the condition $T_i=T_0$, then a BTFD failure is declared (steps 304→306→308→310→312→358→360→362).

A BTFD failure is declared when one of the following results exists for more than one candidate:
(a) $T_i<T_0$, $C_i=0$, and $K_i=1$ (steps 304→328→330→332→334→336);
(b) $T_i=T_0$, $C_i=0$, and $K_i=1$ (steps 304→328→330→332→344→346→348)
(c) $T_i=T_0+1$, $C_i=1$, and $K_i=1$ (steps 304→306→308→320→322→354).

Also, a BTFD failure is declared when none of the candidates passed the CRC test and more than one of the candidates passed the tail bit test, but none of those candidates satisfy either the condition of $T_i<T_0$ or $T_i=T_0$ (steps 304→328→330→332→344→342).

Finally, a correct decode is declared when the following results occur for only one of the M sets of data generated from the M decoding operations:
(a) $T_i=T_0$, $C_i=0$, and $K_i=1$ (steps 304→328→330→332→344→346→350);
(b) $T_i<T_0$, $C_i=0$, and $K_i=1$ (steps 304→328→330→332→334→352);
(d) $T_i=T_0+1$, $C_i=1$, and $K_i=1$ (steps 304→306→308→320→322→324).

Referring back to FIG. 2, the method of the present invention moves to step 208 after having applied an algorithm such as the one discussed above (and depicted in FIG. 3) in step 206 whereby the algorithm yielded a BTFD failure. When a correct decode has been decided from one of the M sets of decoding data, the method of the present invention moves to step 210. In step 210, the corresponding information size value of the transport channels are determined from a table lookup based on the information size value of the guiding channel that yielded a correct decode. For example, if the information size value of 81 yielded a correct decode for information received over the guiding channel (i.e., TrCh1), then according to the lookup table, the corresponding information size values for TrCh2 is 103 bits and the information size value for TrCh3 is 60 bits. The format of the transport channel is thus detected. The information size values for TrCh2 and TrCh3 can thus be used to decode the Class B and Class C information bits respectively. It should be noted that mapping techniques other than the use of a lookup table can be used. In other words, the detected information size value for the guiding channel can be used to point to the information size values of the other channels of the communication system yielding the format of the received information., Such other techniques as using the memory address or storage address of the detected information size value for the guiding channel to point to the corresponding memory addresses of the information size value of the other transport channels can be used for example.

We claim:

1. A method of format detection for information received over a communication system, the method comprising the step of determining the format of the received information by decoding received information extracted from a defined guiding channel, wherein information size values obtained from a defined list of size values for the guiding channel are used in the decoding, wherein the step of determining the format comprises the steps of:
extracting received information from other channels of the communications system;
performing decoding operations on the extracted guiding channel information M times where M is an integer that represents a total number of information size values in said list;
deciding which of the M decoding operations resulted in a correct decode; and
determining the format of the received information from the information size value of the guiding channel that yielded the correct decode, and wherein the step of deciding which of the M decoding operations resulted in a correct decode comprises the steps of:
performing at least one decode operation on the extracted guiding channel information yielding at least one decode result; and
applying the at least one decode result to an algorithm for deciding whether there is a correct decode and which information size value yielded such correct decode, wherein the communication system is a 3GPP compliant UMTS where the guiding channel is TrCh1 and the decoding operations comprise convolutional decoding yielding a result on which a tail bit test and CRC decoding are performed wherein each such operation is performed M times.

2. The method of claim 1 where the format being determined are transport formats of TrCh2 and TrCh3 based on a format detected for TrCh1.

3. A method of format detection for information received over a communication system, the method comprising the step of determining the format of the received information by decoding received information extracted from a defined guiding channel, wherein information size values obtained from a defined list of size values for the guiding channel are used in the decoding, wherein the step of determining the format comprises the steps of:
  extracting received information from other channels of the communications system;
  performing decoding operations on the extracted guiding channel information M times where M is an integer that represents a total number of information size values in said list;
  deciding which of the M decoding operations resulted in a correct decode; and
  determining the format of the received information from the information size value of the guiding channel that yielded the correct decode, and
wherein the step of deciding which of the M decoding operations resulted in a correct decode comprises the steps of:
  performing at least one decode operation on the extracted guiding channel information yielding at least one decode result; and
  applying the at least one decode result to an algorithm for deciding whether there is a correct decode and which information size value yielded such correct decode, and
wherein the communication system is a 3GPP compliant UMTS where the guiding channel is TrCh1 and the decoding operations comprise convolutional decoding yielding a result on which a tail bit test and CRC decoding are performed wherein each such operation is performed M times, and
wherein the decoding operations yield decoding results that are used in the algorithm to decide the correct decode where the CRC decoding for the $i^{th}$ operation yields a value $C_i$, and the tail bit test yields values $T_i$ and $K_i$ where i is any integer equal to M or less and, wherein (a) $C_i=1$ indicates a CRC pass;
(b) $C_i=0$ indicates a CRC fail;
(c) $T_i$ is an integer value that represent a total number of "1" bits occurring in the tail bits of the convolutional decoding result and further, $T_0$ is a defined threshold value that is an integer equal to 1 or greater;
(d) $K_i=1$ indicates a tail bit test pass condition where $T_i \leq T_0$; and
(e) $K_i=0$ indicates a tail bit test fail.

4. The method of claim 3 where a correct decode is declared when any one of the following conditions occurs from one of the M decoding operations:

(a) only one of the decoding operations yielded in a CRC pass;
(b) none of the decoding operations yielded a CRC pass, and of these, only one passed the tail bit test;
(c) none of the decoding operations yielded a CRC pass, but more than one passed the tail bit test, and of these, only one satisfies the condition $T_i=T_0$;
(d) none of the decoding operations yielded a CRC pass, but more than one passed the tail bit test, and of these, only one satisfies the condition $T_i<T_0$;
(e) More than one decoding operation yielded a CRC pass, but none passed the tail bit test, and of these, only one satisfies the condition $T_i=T_0+1$;
(f) More than one decoding operation yielded a CRC pass and passed the tail bit test, but only one of these satisfy the condition $T_i<T_0$;
(g) More than one decoding operation yielded a CRC pass, and of these, only one passed the tail bit test; and
(h) More than one decoding operation yielded a CRC pass and passed the tail bit test, but only one satisfies the condition $T_i=T_0$.

5. The method of claim 3 where a BTFD failure is declared when any one of the following sets of values or conditions occur from at least one of the M decoding operations:

(a) none of the M decoding operations yielded either a CRC pass or a tail bit test pass result;
(b) none of the M decoding operations yielded a CRC pass, but more than one passed the tail bit test and none of these satisfy the condition $T_i=T_0$ condition;
(c) none of the M decoding operations yielded a CRC pass but more than one passed the tail bit test, and of these, more than one decoding operation yielded the values $C_i=0$; $K_i=1$; $T_i=T_0$;
(d) none of the M decoding operations yielded a CRC pass, but more than one passed the tail bit test, and of these, more than one yielded values of $C_i=0$; $K_i=1$; $T_i<T_0$;
(e) more than one of the M decoding operations yielded a CRC pass, but none passed the tail bit test, and of these, none satisfy the condition $T_i=T_0=1$;
(f) more than one of the M decoding operations yielded a CRC pass, but none passed the tail bit test, and of these, more than one yielded the values $C_i=1$; $K_i=1$; $T_i=T_0+1$;
(g) more than one of the M decoding operations yielded values of $C_i=1$; $K_i=1$; $T_i<T_0$;
(h) more than one of the decoding operations yielded a CRC pass and a tail bit pass result, and of these, none satisfy the conditions $T_i<T_0$ or $T_i=T_0$; and
(i) more than one of the decoding operations yielded a CRC pass and a tail bit test pass result, and of these, more than one yielded values of $C_i=1$; $K_i=1$; $T_i=T_0$.

* * * * *